Patented Nov. 5, 1946

2,410,455

UNITED STATES PATENT OFFICE 2,410,455

METHOD OF PRESERVING VITAMIN-CONTAINING OILS

Sidney Musher, New York, N. Y., assignor to Musher Foundation Incorporated, New York, N. Y., a corporation of New York No Drawing. Application March 11, 1939, Serial No. 261,312

8 Claims. (Cl. 167—81)

This invention relates to the preparation of medicinal oil and vitamin emulsions and deals particularly with high vitamin containing medicinal oils and in aqueous emulsified form and substantially stabilized against oxidative deterioration, rancidity and loss of vitamin content.

The vitamin containing oils such as cod liver oil which contain both vitamins A and D are highly subject to oxidative deterioration. This oxidative deterioration causes not only decomposition, deterioration and rancidity of the oil, but it also causes loss in vitamin potency.

This deterioration very materially increases when the oil is subjected to contact with water or when it is exposed to air. It is particularly subject to oxidation, for example, when the oil is incorporated in emulsified form in water because then each of the globules of the oil is directly contacted with the water and hydrolysis and oxidation take place very rapidly under these circumstances.

It has now been found that emulsions and aqueous dispersions of these vitamin containing oils may be prepared which will be highly stable and which will not only tend to maintain the vitamin potency but will actually stabilize the oils against oxidative deterioration and tend to render them even less stable to oxidative deterioration than if they were kept in substantially pure condition free of contact with water or similar aqueous substance.

It has been found that this protective effect may be obtained by dispersing vitamins and/or the oil containing the same in for example, blackstrap molasses, either refinery or raw blackstrap, sorghum molasses, and so forth.

Among the most suitable materials to serve as the aqueous phase is blackstrap molasses. Molasses of this type may be obtained by taking the water extract of the sugar cane, evaporating to the point of crystallization of the sucrose crystals, removing by centrifugal filtration the crystallized portions which are substantially free of the impurities that are desirable for the purpose of this invention, adding the uncrystallized fraction back to another batch of sugar for concentration and crystallization, removing the uncrystallized portion the second time and adding such uncrystallized portion back to another batch of uncrystallized cane sugar extract, and then crystallizing out the maximum portion possible and removing those crystals by centrifugal filtration and leaving behind the uncrystallized black heavy mother liquor or residue which may be referred to as blackstrap molasses. This product consists not only of carbohydrates but of such other necessary ingredients which co-act with the carbohydrates to produce the necessary stabilizing activity as described in this application.

In accordance with this invention the vitamin containing oils, such as the fish liver oils, normally subject to oxidative deterioration, loss of vitamin A content and development of rancidity are substantially stabilized by adding to them and thoroughly mixing therein relatively large quantities of the unbleached, raw mother liquors obtained during the crystallization of sugars such as of cane and beet sugars.

For example, cod liver oil which is normally readily subject to rancidity and loss of original vitamin A content may be admixed in and thoroughly incorporated with about from 4 to 15 times its weight of blackstrap molasses and a marked stabilizing action will be obtained.

Example I

Freshly expressed cod liver oil was added slowly to blackstrap molasses, subjecting the molasses to rapid agitation during that period, until 15% of the oil was incorporated. The molasses was so heavy that the oil remained in suspension in the form of relatively large globules. The molasses oil emulsion was then set aside in open beakers at 98° F., compared with the untreated cod liver oil free of molasses, and peroxide determinations were taken at regular intervals of the oil alone and of the oil extracted from the oil-molasses combination.

|  | Peroxides after— | | |
|---|---|---|---|
|  | 5 days | 15 days | 30 days |
| Oil alone | 38 | 275 | 1,465 |
| Oil in molasses | 2.4 | 15.8 | 183 |

The above results obtained by peroxide determination are indicative also of the degree of protection obtained against loss of the vitamin A, which is so subject to oxidative deterioration and which is lost so rapidly when the oil in which it occurs or into which it is incorporated becomes rancid or oxidized.

Other medicinal oils that may be treated in accordance with this invention include the entire field of the fish liver oils such as halibut liver oil, tunafish liver oil, etc., the body fish oils such as salmon oil, sardine oil, menhaden oil, herring oil, mackerel oil, etc., and similar oils.

There may also be protected in this manner the vitamins, and particularly vitamin A when extracted from vitamin A containing materials such as when obtained in concentrated form from the unsaponifiable fraction of the fish oils, when extracted from vegetable matter such as in the form of carotene from carrots, alfalfa, etc., and when such relatively pure vitamins are incorporated into oils to act as carriers for the vitamins. For example, cod liver oil may be saponified and the concentrated vitamin A containing fraction separated out, and this fraction added back to cottonseed, sesame, or other vegetable or animal oil or fat, or even to mineral oil. When the vitamin in that carrier is added to blackstrap molasses, for example, there is obtained a marked stabilization against not only rancidity, but of even greater importance, against loss of the vitamin content.

In addition, the substantially purified vitamin will be rendered substantially stabilized against loss of its vitamin potency and will retain its original potency to much more marked degree by incorporating it in the blackstrap molasses or similar product to be used in accordance with this invention.

Refined cane sugar, refined dextrose, etc., are not satisfactory for use in accordance with this invention to obtain the results that have been set forth herein. In addition to blackstrap molasses which contains both the carbohydrate material and also the small amount of impurities that are so essential to react with the carbohydrate and produce the desired stabilizing action, there may be used ordinary unbleached raw molasses obtained as a residue or mother liquor during any single crystallization of the original sugar. There may also be utilized raw cane or raw beet sugar, and desirably if these sugars are dissolved in a concentrated water solution so as to produce a molasses-like consistency. In view, however, of the greater effectiveness of blackstrap molasses obtained as an accumulation of residues during the refining of the sugar from its crudest condition and also in view of its extremely low cost, this molasses is by far most desirable. Such sugar as is employed should desirably be in aqueous condition so that an emulsified condition is brought about by the addition of the oil to the sugar material.

The medicinal oil containing the vitamins may be added to the molasses in any desired amount such as from 1 part of molasses and 20 parts of oil to 20 parts of molasses and one part of oil. The desirable proportion, however, is to use from 5% to 25% of the oil in the molasses thoroughly incorporated therein. The emulsion obtained may either be of the oil-in-water type or of the water-in-oil type but by far the most satisfactory results are obtained when the water constitutes the continuous phase. Where the vitamin in concentrated form is incorporated in the molasses, a smaller proportion of the concentrated vitamin product will be used such as from 0.1% to 5% against the weight of the molasses.

Although a thorough admixture of the vitamin oil in the molasses is sufficient to produce markedly improved stability, homogenization or other processing that would more thoroughly produce contact between the oil globules and the molasses or other sugar material gives even greater stabilizing action. This result is particularly unusual since it is normally to be expected that the oil globules in contact with the water of the sugar would be rendered much more unstable than if they were not in contact with such aqueous product.

*Example II*

To blackstrap molasses was added slowly while agitating 25% of sardine oil. The agitating was continued until a homogeneous mixture was formed. A portion of this mixture was then put through a colloid mill so that the oil particles were much more finely dispersed and there was substantially no settling out of any of the cod liver oil in the emulsion. Samples from each lot were set aside and tested as in Example I with the following results:

|  | Peroxides after— | | |
| --- | --- | --- | --- |
|  | 10 days | 20 days | 30 days |
| Oil molasses mixture | 28.5 | 165 | 454 |
| Oil molasses mixture put through colloid mill | 14.6 | 62 | 230 |

It has furthermore been found that a substantially greater improvement in stability is obtained when the oil-molasses or similar mixture is subjected for a relatively short time period to an elevated temperature of over 150° F. and desirably over 215° F. and most preferably over 250° F. Temperatures as high as 400° F. may be employed, and the higher the temperature the greater the stabilizing action. The heat treatment should be employed after the oil syrup mixture has been made in order to obtain maximum beneficial results. It is furthermore desirable for the oil to be in substantially emulsified condition before heating so that each particle or globule of oil is in immediate and direct contact with the stabilizing sugar material.

*Example III*

To blackstrap molasses was added slowly while agitating 10% of salmon oil and the mixture was then put through a colloid mill as in Example II. One portion of the molasses oil mixture was heated to 245° F. for 15 minutes and then allowed to cool, while the other portion was left unheated. Both lots were tested as in Example I.

|  | Peroxides after— | | |
| --- | --- | --- | --- |
|  | 20 days | 30 days | 40 days |
| Unheated mixture | 35 | 352 | 740 |
| Heated mixture | 4.5 | 13.9 | 92 |

The heat treatment may be carried out for any desired period such as by merely heating to the high temperature and immediately allowing to cool or by holding at that temperature for a short period of, for example, from 5 to 30 minutes.

Where desired the vitamin containing oil may be heated with a relatively small quantity of the sugar stabilizing material, such as with from 2% to 20% of that sugar, and after the heat treatment, adding the balance of the sugar. This may particularly be done where it is desired to heat to a temperature sufficiently high to burn or char the sugar material such as at about 400° F. to 450° F. for a short period.

*Example IV*

Crystallized raw beet sugar was added in an amount of 7% to cod liver oil. While holding the sugar in the oil using agitation, the mixture was heated to 375° F. and held at that temperature for 10 minutes after which it was allowed to cool. The oil thus treated and containing the burnt sugar residue was added slowly to blackstrap molasses during constant and thorough agitation until 10% of the oil had been added. The oil containing the raw beet sugar burnt in it and then added to the molasses was approximately one-half as susceptible to rancidity and to loss of its vitamin A content as the oil which was added direct to the molasses without having had the preliminary heat treatment with the raw beet sugar.

The products principally produced in accordance with this invention are aqueous emulsions of the oil-in-water type, with the oil constituting the disperse phase and the sugar-water solution, the continuous phase.

The oil-molasses emulsions thus obtained may be used for addition to animal or poultry food or for any normal purpose and the stability against oxidative deterioration will be retained even though such emulsion is incorporated in a composition containing such prooxidants such as copper or other metallic salts, for example.

The following are examples of sugar materials employed and with which stabilized vitamin containing fish oils were prepared by mixing them thoroughly in an amount of 10% until the oil globules were thoroughly and completely coated with the sugar solutions referred to below and then heated to 275° F. for 5 minutes.

Blackstrop molasses containing finely dispersed therein 2% soya lecithin.
Raw beet liquor (not crystallized) containing dissolved therein 3% tartaric acid.
Sorghum molasses containing finely dispersed and dissolved therein 10% powdered skim milk.

Among other medicinal oils that may similarly be treated for stabilizing in accordance with this invention and whereby in aqueous emulsified condition they are substantially stabilized against oxidative deterioration are such oils as castor oil, mineral oil, etc.

For example, castor oil acquires its characteristic objectionable odor and taste as rancidity sets in. This has been avoided to a very marked degree by adding the castor oil to blackstrap molasses in amounts as indicated above, thoroughly admixing, and then heating to 260° F. for 5 minutes.

Refined concentrated sugars or refined concentrated sugar solutions may much less preferably be employed, particularly where the medicinal fish or fish liver oil has a naturally high phosphorous or phosphatide content to react with the sugar at the high heat.

The molasses may have added to it and thoroughly admixed therein a relatively small amount of lecithin, phosphoric acid, phosphatide or aliphatic polycarboxylic acid to enhance still further the stabilizing activity produced. For example, instead of using blackstrap molasses alone, there may be used combinations of molasses and phosphoric acid, combinations of molasses emulsified with phosphatide such as lecithin or the phospholipins, or combinations of molasses and a polycarboxylic aliphatic acid such as tartaric acid, citric acid, malic acid, etc. These added phosphorous containing compounds or acids are generally added in relatively small proportions such as from 1% to 15% by weight against the solids weight of the molasses.

Having described my invention, what I claim is:

1. A process of preparing a stabilized fish oil emulsion which comprises adding the fish oil slowly to blackstrap molasses with agitation, passing through a colloid mill and then heating to 245° F. for 15 minutes, whereby marked enhancement in stabilizing activity is obtained.

2. A process of preparing a stabilized cod liver oil emulsion which comprises adding about 7% of raw beet sugar to the cod liver oil, agitating and heating the mixture to 375° F. for about 10 minutes, allowing the oil to cool, adding the oil slowly to blackstrap molasses with constant and thorough agitation until about 10% of the oil has been added, whereby marked enhancement in stabilizing activity is obtained.

3. A method of stabilizing a vitamin containing glyceride oil against oxidative deterioration which comprises dispersing a minor amount of the vitamin containing glyceride oil in blackstrap molasses, and then heating to above about 150° F. whereby marked enhancement of antioxygenic activity is obtained.

4. A method of stabilizing a vitamin containing glyceride oil against oxidative deterioration which comprises dispersing a minor amount of the vitamin containing glyceride oil in molasses, and then heating to above 215° F., whereby marked enhancement of antioxygenic activity is obtained.

5. A method of preserving fat soluble vitamins which comprises emulsifying them in molasses and heating to over 150° F. whereby an enhancement of antioxygenic effect is obtained.

6. A method of preserving glyceride oil containing vitamins which comprises emulsifying them in molasses and heating to over 150° F. whereby an enhancement of antioxygenic effect is obtained.

7. A method of preserving fish oils which comprises emulsifying them in molasses and heating to over 150° F. whereby an enhancement of antioxygenic effect is obtained.

8. A method of preserving glyceride oil containing vitamins which comprises emulsifying them in a combination of molasses and a phosphatide and heating to over 150° F. whereby an enhancement of antioxygenic effect is obtained.

SIDNEY MUSHER.